United States Patent [19]

Scherhag

[11] Patent Number: 5,482,690
[45] Date of Patent: Jan. 9, 1996

[54] LOW-RESIDUE HIGH-EXTRACTION PRODUCTION OF SODIUM DICHROMATE

[75] Inventor: Karl-Christoph Scherhag, Bergisch Gladbach, Germany

[73] Assignee: Bayer Aktiengesellschaft, Leverkusen, Germany

[21] Appl. No.: 369,854

[22] Filed: Jan. 6, 1995

Related U.S. Application Data

[63] Continuation of Ser. No. 139,256, Oct. 20, 1993, abandoned.

[30] Foreign Application Priority Data

Oct. 27, 1992 [DE] Germany .................. 42 36 202.4

[51] Int. Cl.⁶ .................. C22B 34/32; C01G 37/00; C01G 37/14
[52] U.S. Cl. .................. 423/61; 423/53; 423/596; 423/597
[58] Field of Search .................. 423/61, 53, 595, 423/596, 597

[56] References Cited

U.S. PATENT DOCUMENTS

| | | | |
|---|---|---|---|
| 1,951,091 | 3/1934 | Haglund | 423/595 |
| 2,123,240 | 7/1938 | Hammarberg | 423/53 |
| 3,105,756 | 10/1963 | Green | 423/61 |
| 3,812,234 | 5/1974 | Schafer et al. | 423/61 |
| 3,932,598 | 1/1976 | Cooper et al. | 423/61 |
| 4,244,925 | 1/1981 | Subbanna et al. | 423/61 |
| 4,355,006 | 10/1982 | Rademachers et al. | 423/61 |

FOREIGN PATENT DOCUMENTS

| | | | |
|---|---|---|---|
| 134231 | 9/1949 | Australia | 423/61 |
| 513152 | 10/1939 | United Kingdom | 423/57 |
| 1186439 | 4/1970 | United Kingdom | 423/61 |
| 1438340 | 6/1976 | United Kingdom . | |
| 2073724 | 10/1981 | United Kingdom . | |

OTHER PUBLICATIONS

Ullmann's Encyclopedia of Industrial Chemistry, Vo. A7, Chromium Compounds, pp. 67–97, (1986), (No Month).
WPI Abstract 85–234945/38 & SU 1142448, Feb. 28, 1985.

*Primary Examiner*—Steven Bos
*Attorney, Agent, or Firm*—William C. Gerstenzang; Sprung Horn Kramer & Woods

[57] ABSTRACT

The invention relates to a process for the low-waste production of sodium dichromate from the mineral chromite with simultaneous recovery of low-carbon ferrochromium.

1 Claim, 1 Drawing Sheet

LOW-RESIDUE HIGH-EXTRACTION PRODUCTION OF SODIUM DICHROMATE

This application is a continuation, of application Ser. No. 08/139,256, filed on Oct. 20, 1993, now abandoned.

BACKGROUND OF THE INVENTION

1. Field of the Invention

This invention relates to a process for the low-waste production of sodium dichromate from the mineral chromite with simultaneous recovery of low-carbon ferrochromium.

Of the various minerals which contain chromium, only the chromium spinels, particularly chromite (chrome ironstone, idealized: $FeCr_2O_4$), are of economic importance.

Sodium dichromate is by far the most important starting material for the production of chromium compounds.

Accordingly, the conversion of chromite into sodium dichromate is the crucial step from the minerals to the chromium chemicals with their broad range of applications.

2. Description of the Prior Art

The only process carried out on an industrial scale is based on the alkaline digestion of chromite with soda or sodium hydroxide and air in the presence of a leaning agent. This process which is described in detail elsewhere is attended by two serious disadvantages, namely:

a) The chromium is never completely dissolved out, the yield reaching just under 90% of the original content of $Cr_2O_3$; 4 to 6% $Cr_2O_3$ remain in the residue.

b) The elements accompanying the chromium as oxides and hydroxides form the residue which has to be discarded and disposed of. The principal constituent of the residue is iron oxide although it cannot be put to any further use in this impure form. The chromate obstinately remaining therein has to be rendered inert by an aftertreatment.

c) The digestion process is very slow so that the starting materials have to be very finely ground to achieve economically acceptable reaction times.

d) The excess of alkaline digesting agent, for example sodium carbonate or sodium hydroxide, has to be limited to minimize digestion of the approximately 5 to 28% aluminum oxide present in the chromite. The quantities of valuable alkali used for the digestion of aluminium oxide are not only lost, their presence in the sodium chromate solution produced from the digested material can also lead to serious problems in the further course of the process. The aluminate passing into solution despite the limitation of the quantities of alkaline digesting agent has to be precipitated with acidic agents, preferably with dichromate solution, during the actual dissolution process.

More recently proposed processes, for example oxidation in the melt, have done little to eliminate these disadvantages. In addition, they impose exacting demands on the furnace material so that these problems have never been completely solved.

The accumulation of large quantities of residue also cannot be avoided by digestion with potassium hydroxide or potassium carbonate; to the contrary, voluminous aluminum hydroxide precipitation sludges are obtained.

The digestion of chromium ore with acid does not exceed 90% either. Iron and aluminum accumulate in the form of impure and hence worthless sulfates or ammonium double sulfates.

The chloridizing of chromium ore to form basically separable Fe(III) chloride and chromyl chloride is accompanied by extensive chloridizing of the secondary constituents and hence is a burden at the working up stage due to the accumulation of solutions of the metal chlorides.

Numerous attempts have also been made to use ferrochromium for the production of chromium chemicals by oxidation with air and with electrical current or chlorine or sulfuric acid. Despite a possible increase in the yield of chromium to 96% of the theoretical, none of these processes is capable of easing or even solving the problem of waste, particularly iron in the form of worthless iron hydroxides.

The only industrially practiced method mentioned above for the production of sodium dichromate as the most important starting material for all chromium chemicals essentially comprises three stages, namely:

oxidizing digestion of chromium ore or chromium ore concentrate under alkaline conditions leaching out the sodium chromate formed converting the sodium monochromate into dichromate by acidification of the solution.

In addition to chromite and sodium alkalis, particularly sodium carbonate, substances which are intended to maintain the porosity of the furnace charge during the digestion process ("leaning agents") are added to the burden. Porosity is necessary for forming a sufficiently large surface for the reaction with oxygen. The yield of chromium where chromite is used is between 74 and 90% of the chromium present in the chromium ore, depending on its composition.

The soluble monochromate is removed by filtration, mainly through drum filters, after cooling and leaching at a pH value adjusted by addition of acids or dichromate solution. The insoluble residue is repeatedly leached to reduce the content of Cr(VI). Part of the residue may be dried so that it may be reintroduced as leaning agent into the furnace burden.

The residue remaining is subjected to a reduction process in order to insolubilize the Cr(VI) remaining. This is done by treatment with reducing agents, for example Fe(II) sulfate (see also Ullmann's Encyclopedia of Industrial Chemistry, 5th Edition, Weinheim, 1986).

MgO, $Fe_2O_3$ and $Al_2O_3$ participate to a very limited extent, if at all, in the digestion process. Nevertheless, they are passed through the furnace, expensively separated and finally aftertreated and disposed of as fine-particle, reactive, oxidized water-rich sludge containing residual chromium.

The $SiO_2$ introduced and the aluminum oxide partly take place in the digestion process by reaction with the alkali carbonate (soda consumption by binding into the residue as aluminosilicate).

Accordingly, the problem addressed by the present invention was to provide a process for the production of sodium dichromate which 1. would enable the chromium present in the chromite to be almost completely reacted, 2. would reduce the input of accompanying elements into the digestion process and, hence, reduce or even totally avoid the amount of residue for disposal, 3. and at the same time would put the iron present in the chromite to some use, 4. would largely reduce or even totally eliminate the expense involved in keeping troublesome impurities, such as aluminium, away from the alkaline sodium chromate solution.

SUMMARY OF THE INVENTION

The problem stated above is solved by a process for the low-waste, high-extraction production of sodium dichromate from chromite, comprising in a first stage reducing chromite to an iron/chromium alloy, in a second stage reacting the iron/chromium alloy with oxygen to form a low-carbon ferrochromium melt and a slag insoluble therein, which slag is rich in chromium oxide (>80% $Cr_2O_3$), reacting the slag with sodium carbonate, circulating leaning agent and oxygen to form sodium chromate, and converting the sodium chromate into sodium dichromate.

Any chromates ranging from approximately 40% to approximately 60% in their $Cr_2O_3$ content may be used as starting material for the process according to the invention. Both lump ore and concentrate may be used.

In a first step, the chromium ores mentioned are reduced to ferrochromium and a slag in typical furnaces using coke or coal and electrical current. Processes for the reduction of lump chrome ore are well documented (see Ullmann, Vol. A7, pages 48–58). Numerous furnaces have recently been developed for processing concentrate. These processes either operate with plasma burners or pre-reduce the chromite in a rotating tube.

Reduction is preferably carried out in such a way that the silicon content in the ferrochromium formed is extremely low, preferably below 3%. This can be achieved in known manner by low reduction temperatures and by producing a low-viscosity, low-melting slag.

This reduction step gives two phases at temperatures of approximately 1500° C. or higher:

A slag which contains the secondary constituents MgO and $Al_2O_3$ present in the chromite and which may be conditioned for use as building materials or fillers either as such or by addition of Ca-containing substances or quartzite.

The second phase is the metallic phase, the ferrochromium, which contains the largest part of the chromium and iron bound in the spinel. In addition, the ferrochromium contains residual carbon (5 to 7%) and fractions of Si through reduction of silicates present in the ore.

The slag and the liquid ferrochromium are separated. The largely chrome-free slag is used as a building material or as an inert, non-oxidizable and non-leachable, low-volume filler.

In a second step, the ferrochromium is fed to a converter in which the melt is freshened with oxygen or oxygen-containing gases. The oxygen may be introduced by lances or by variously arranged tuyeres or by a combination of both methods.

In the treatment of a melt of the type in question with oxygen or oxygen-containing gases, the carbon bound as carbide to the chromium and the silicon preferably undergo oxidation in an initial phase. With increasing decarburization, chromium is also oxidized. In general, 2 to 15% of the chromium present in the ferrochromium are oxidized in this step, although basically the chromium may even be oxidized to a greater extent during freshening. In general, freshening is carried out after addition of additives which bind silicon dioxide, such as lime or dolomite. In the process according to the invention, the addition is preferably limited to no more than twice the stoichiometric quantity, based on the silicon content of the ferrochromium. The oxides formed accumulate in the slag on account of their non-metallic character. On completion of the freshening step, two phases are again present, namely:

a slag containing increased levels of oxidized chromium and a low-carbon residual metal phase which is free from silicon and which consists: essentially of iron and the non-oxidized chromium (low- or medium-carbon ferrochromium).

The two phases are separated. This may be done by tilting the converter or by tapping via a runner and skimmer bar. More slag rich in chromium oxide can be obtained from the waste gas of the freshening step through the precipitation of entrained solids from the gas stream.

The metal phase is put to another use in the steel industry while it is still liquid or after it has solidified. According to the invention, the slag with its high $Cr_2O_3$ content is subjected to oxidizing digestion under alkaline conditions for the production of sodium chromate. The freshening of the ferrochromium melt may of course also be carried out in two stages in order, for example, to reduce the silicon content by oxidation in a first freshening stage and to separate a slag rich in silicon dioxide (a suitable starting material for the production of ferrosilicochromium) and to produce the slag rich in chromium oxide suitable for the process according to the invention in a second freshening stage.

The reaction of the slag with sodium-based alkaline digesting agent, particularly sodium carbonate, may take place in accordance with the following scheme:

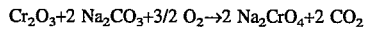
$$Cr_2O_3 + 2\ Na_2CO_3 + 3/2\ O_2 \rightarrow 2\ Na_2CrO_4 + 2\ CO_2$$

The reaction of Cr slag and sodium carbonate may take place, for example, in exactly the stoichiometric ratio. Where a slag containing 90% $Cr_2O_3$ is used, 100 parts slag have to be reacted with 125 parts sodium carbonate in the presence of approximately 380 parts inert material (leaning agent). Sodium carbonate may of course also be used in more than or less than the stoichiometric quantity. An excess generally results in acceleration of the digestion process.

The sodium chromate produced is extracted from the clinker by leaching with water. The alkaline sodium-based digesting agent used in excess and sodium silicate dissolve together with the sodium chromate. This aqueous solution may be removed without pH adjustment, i.e. without acids or dichromate solution having to be added to precipitate aluminate. In this way, all the sodium usefully remains in the solution. Silica is precipitated therefrom by addition of acid, preferably carbonic acid, to the filtrate for pH adjustment to 4–8.

Carbonic acid is particularly preferred for the pH reduction because, in the event of subsequent conversion of the sodium chromate into sodium dichromate, all the sodium used can be recovered as sodium bicarbonate by pressure acidification with carbonic acid. The chromium-containing silica removed may be used as a raw material in the production of ferrosilicochromium. The chromate-containing filtrate is further processed in known manner to sodium dichromate whereas the residue may be reused without further careful washing as inert material/leaning agent in the oxidizing alkaline digestion either directly or after drying, for example with hot waste gases, but preferably by mixing with hot chromium oxide slag from the freshening process. It is only periodically that part of the residue has to be removed commensurate with the amount of substances which are introduced with the slag of the freshening process and which are not $Cr_2O_3$, and either returned to the ferrochromium production process or leached with carbonic acid for the selective removal of calcium carbonate or used for another purpose or disposed of after washing out and, optionally, reduction.

This partial removal may also take place continuously from a small sidestream. In all events, the quantity of fine-particle, reactive digestion residue to be removed is drastically reduced in relation to the direct use of chromite.

Another way of reacting slag and sodium carbonate without having to use leaning agent brought in from outside is to replace the leaning agent by Cr slag. In this case, sodium carbonate is only added to the burden in such a quantity that only pan of the slag reacts to form sodium chromate and the solid-to-melt ratio in the furnace remains intact in contrast to separate leaning, for example with $Fe_2O_3$.

For example, 500 parts of a slag containing 90% $Cr_2O_3$ are mixed with 140 parts sodium carbonate and reacted in an excess of oxygen at approximately 1070° C. in accordance with the following scheme:

$$Cr_2O_3 + 2\ Na_2CO_3 + 3/2\ O_2 \rightarrow 2\ Na_2CrO_4 + 2\ CO_2$$

The advantage of leaning the slag with more slag lies in the increased availability of chromium minerals in the burden. By comparison with the leaning of chromium ore with an inert material introduced from outside, much more chromium is available to the sodium carbonate added in the case of the slag. This results in a considerably higher reaction rate of the sodium carbonate with the chromium in the slag and hence in the complete reaction of the sodium carbonate.

Where chromium oxide slag is used, pressure, temperature, gas phase composition and fineness of grinding have to meet far less exacting requirements than where chromite is used in the oxidizing alkaline digestion.

Both pure oxygen and air and enriched oxygen and also mixtures thereof with fuel gases may be used as the oxygen source. These various gas mixtures may be used both in directly heated rotating tube furnaces and annular hearth furnaces and in indirectly heated tube furnaces and also in fluidized bed furnaces. In the last case, the mixture of slag rich in chromium oxide, alkaline digesting agent and, optionally, leaning agent to be reacted with the oxygen has to be convened by compacting, for example by pelleting or granulation, into a form suitable for the fluidized bed, solutions containing sodium-alkaline components, such as sodium hydroxide, or binders, such as molasses solution or a phenol/formaldehyde mixture, being added for paste formation and combustible solid components, such as coal dust, being added to increase porosity. Whereas the directly heated digestion units are preferably operated under normal pressure, methods of operation involving elevated pressure of the oxygen-containing gas are advisable for indirectly heated digestion mixtures.

In general terms, therefore, the process according to the invention is carried out as follows:

1. Production of a ferrochromium melt by reduction of chromium ore in lump form or as concentrate
2. The melt is treated with oxygen (so-called freshening) in a suitable vessel (converter). This treatment may be carried out in two ways:
   blowing the oxygen onto the melt with a lance
   injecting the oxygen into the melt through nozzles arranged at the side or at the bottom of the vessel
   or by a combination of both methods.
   In both cases, the oxygen may be mixed with fuel gases or inert gases.
3. The treatment with oxygen is continued until a certain carbon and/or chromium content is reached in the metal bath.
4. On completion of freshening, the slag and the metal phase are removed from the treatment vessel.
5. The metal phase recovered, which consists of low-carbon ferrochromium, is used as a starting material for stainless steel.
6. The slag is subjected to oxidizing digestion under alkaline conditions for the production of sodium chromate; the digestion step may be carried out at the same time as freshening or after cooling and grinding.
7. The aqueous sodium chromate solution produced by leaching of the digested material with water or an aqueous solution is converted into sodium dichromate solution by acidification and, if desired, the sodium dichromate is isolated therefrom.

The process according to the invention affords the following advantages over the prior art:

1. The separation of Cr and Fe in the converter by freshening with oxygen enables chromium oxide slag with high $Cr_2O_3$ contents of up to 100% to be produced.
2. Through the use of a ferrochromium melt as starting material for a synthetic raw material for the production of sodium chromate, the input of the inert constituents MgO, $Al_2O_3$, FeO and $Fe_2O_3$ into the oxidizing alkaline digestion process is considerably reduced.
3. In the production of chromium oxide slag by the described method, the iron does not accumulate as oxide made worthless by impurities, but instead in the form of low-carbon ferrochromium. This alloy is in great demand as a raw material for the production of stainless steel.
4. Since, in the alkaline digestion of the slag rich in chromium oxide, the quantity of inert material (MgO, $Al_2O_3$, FeO and $Fe_2O_3$) reintroduced is small compared with the quantity of circulated leaning agent and since only that quantity of inert material introduced by the slag rich in chromium oxide has to be removed from the circuit, both the leaning agent and the inert material pass repeatedly through the digestion process. This multiple digestion of the same material results in a high extraction of Cr from the raw material used and hence in low $Cr_2O_3$ contents in the small quantity of residue removed from the circuit.
5. Whereas, where chrome ore is used, the $Cr_2O_3$ to be digested is bound into the thermally and chemically resistant structure of the spinel which can only be digested under the most rigorous conditions, the chromium oxide slag produced in the described manner can surprisingly be digested with far less effort. This is also beneficial to the complete reaction of all the chromium present in the chromium oxide slag to sodium chromate.
6. Surprisingly, however, the time required for digestion of the chromium-containing starting material can also be considerably shortened by replacing chromite with the chromium oxide slag typical of the process according to the invention in the oxidizing alkaline digestion process. This surprising effect provides for considerably better volume/time utilization of the digestion furnaces and is technically advantageous.

The easier digestability of the chromium oxide slag typical of the process according to the invention may of course also be utilized to reduce the digestion temperature or to lower the oxygen partial pressure in the furnace atmosphere—in either case by comparison with the digestion of chromite. However, the preferred measure is the increased conversion.

7. The absence of aluminum from the digestion mixture enables the roasted material to be subjected to alkaline leaching so that all the sodium may readily be recovered as sodium bicarbonate.

BRIEF DESCRIPTION OF THE DRAWING

The invention is further described in the accompanying drawing which is a self-explanatory flow sheet of the instant process.

It will be understood that the specification and examples are illustrative but not limitative of the present invention and that other embodiments within the spirit and scope of the invention will suggest themselves to those skilled in the art.

Figure 1:
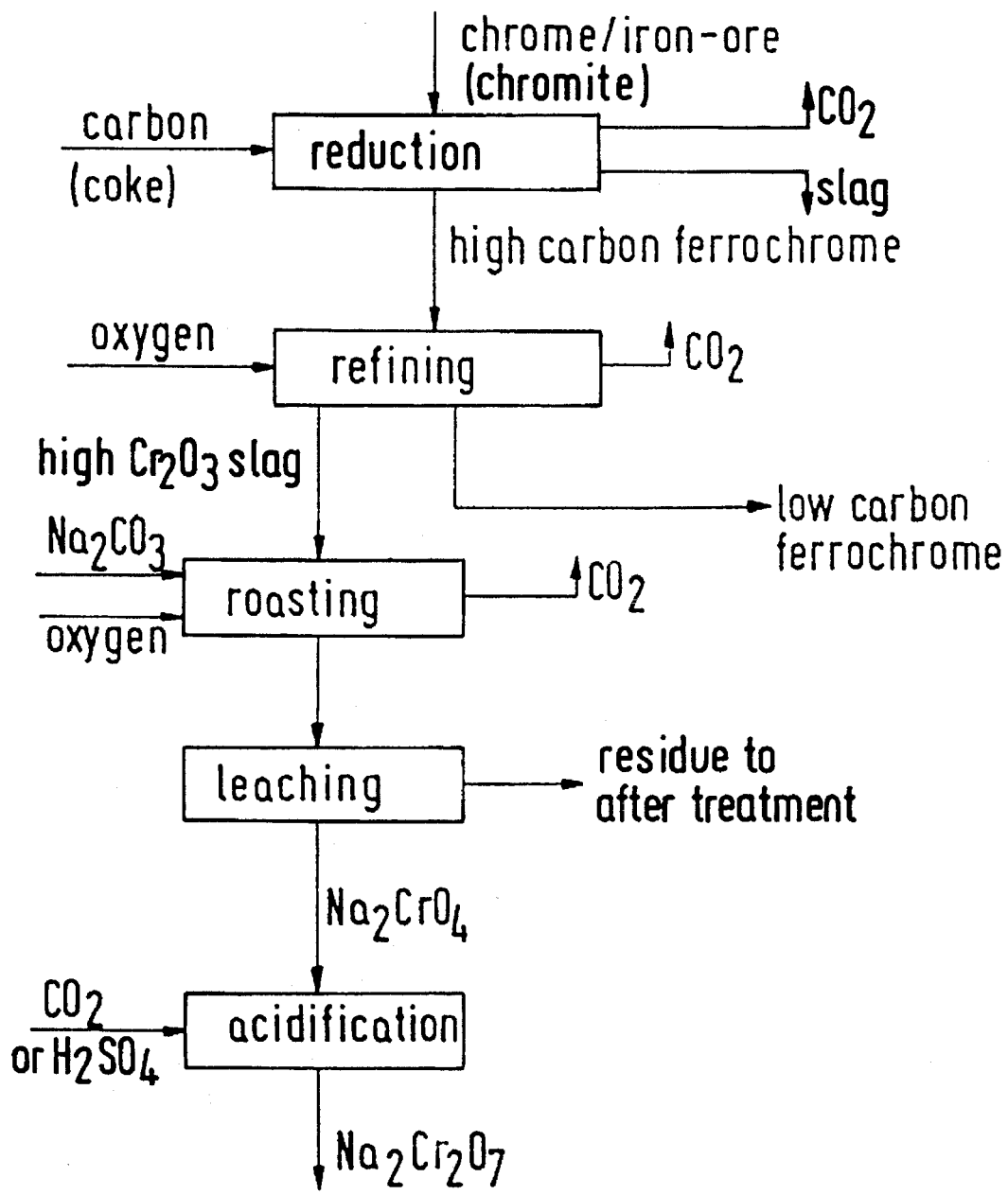

I claim:

1. A process for the low-waste, high extraction production of sodium dichromate from chromite, consisting essentially of the following steps:

a) reducing chromite to form a melted ferrochromium alloy as one phase and a first slag phase, separating said first slag phase from the melted ferrochromium alloy phase and removing said first slag phase from the process;

b) oxidizing the melted ferrochromium alloy with oxygen or an oxygen-containing gas to form a low-carbon ferrochromium melt and a second slag, said second slag being rich in chromium oxide, and then separating said ferrochromium melt from said second slag, and removing said ferrochromium melt from the process;

c) subjecting said second slag from step b) to oxidizing digestion with sodium-based alkaline digesting agent, leaning agent and oxygen, to convert the chromium oxide in said second slag to sodium chromate;

d) leaching said sodium chromate from said second slag with water to form an aqueous solution of sodium chromate and at the same time, reducing the sodium chromate content of said second slag;

e) acidifying said sodium chromate solution to convert the sodium chromate to sodium dichromate and f) recycling a part of said second slag, which has had its sodium chromate content reduced in step d), to step c) to be part or all of said leaning agent, and discarding the remainder of said second slag with reduced sodium chromate content, as a waste product.

* * * * *